US008244315B2

United States Patent
Lee et al.

(10) Patent No.: US 8,244,315 B2
(45) Date of Patent: Aug. 14, 2012

(54) METHOD AND APPARATUS FOR MOBILE PERSONAL VIDEO RECORDER

(75) Inventors: Jaeyong Lee, Sammamish, WA (US); Alex Yoon, Bellevue, WA (US)

(73) Assignee: Vidiator Enterprises Inc., Nassau, New Providence (BS)

( * ) Notice: Subject to any disclaimer, the term of this patent is extended or adjusted under 35 U.S.C. 154(b) by 386 days.

(21) Appl. No.: 12/302,267

(22) PCT Filed: May 17, 2007

(86) PCT No.: PCT/US2007/069124
§ 371 (c)(1),
(2), (4) Date: Aug. 17, 2009

(87) PCT Pub. No.: WO2007/140139
PCT Pub. Date: Dec. 6, 2007

(65) Prior Publication Data
US 2009/0298485 A1    Dec. 3, 2009

Related U.S. Application Data

(60) Provisional application No. 60/802,564, filed on May 22, 2006.

(51) Int. Cl.
*H04M 1/00* (2006.01)
(52) U.S. Cl. .................................. 455/575.1; 455/3.01
(58) Field of Classification Search ........ 455/3.01–3.06, 455/414.1, 575.1–575.6; 725/62, 37–44; 379/88.18; 709/227
See application file for complete search history.

(56) References Cited

U.S. PATENT DOCUMENTS

| 6,553,419 | B1 * | 4/2003 | Ram .............................. 709/227 |
| 6,754,715 | B1 | 6/2004 | Cannon et al. |
| 2005/0037740 | A1 | 2/2005 | Smith et al. |
| 2006/0253874 | A1 * | 11/2006 | Stark et al. ....................... 725/62 |
| 2007/0111657 | A1 * | 5/2007 | Yamada et al. ............... 455/3.01 |
| 2007/0118660 | A1 * | 5/2007 | Garcia-Martin ........... 455/575.1 |
| 2007/0201637 | A1 * | 8/2007 | Brown et al. ............... 455/414.1 |

FOREIGN PATENT DOCUMENTS

| TW | I255614 | 5/2006 |
| WO | 01/93588 A2 | 12/2001 |

OTHER PUBLICATIONS

International Search Report for Application PCT/US07/069124, mailed Sep. 26, 2008, 2 pages.
International Preliminary Report on Patentability for Application PCT/US2007/069124, mailed Nov. 27, 2008, 6 pages.
Written Opinion of the International Searching Authority for Application PCT/US07/069124, mailed Sep. 26, 2008, 5 pages.
Office Action for Taiwan Patent Application No. 96118031, mailed Feb. 11, 2011, 9 pages.
Supplementary European Search Report for EP Patent Application No. 07783864.7, issued Jan. 25, 2012, 9 pages.
Chinese Office Action for Application No. 200780028008.7, issued Nov. 30, 2011.

* cited by examiner

*Primary Examiner* — Lana N Le
(74) *Attorney, Agent, or Firm* — Graybeal Jackson LLP

(57) ABSTRACT

Methods and apparatuses for remotely recording video content on a personal video recording server, at the request of a user of a mobile device, and obtaining that recorded content on the mobile device, in some embodiments, at a later time.

26 Claims, 6 Drawing Sheets

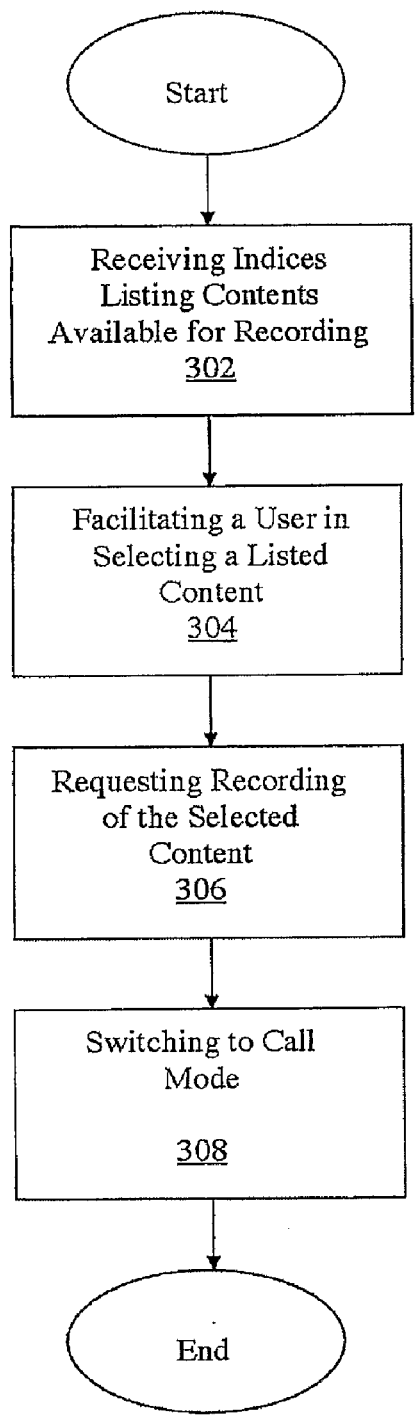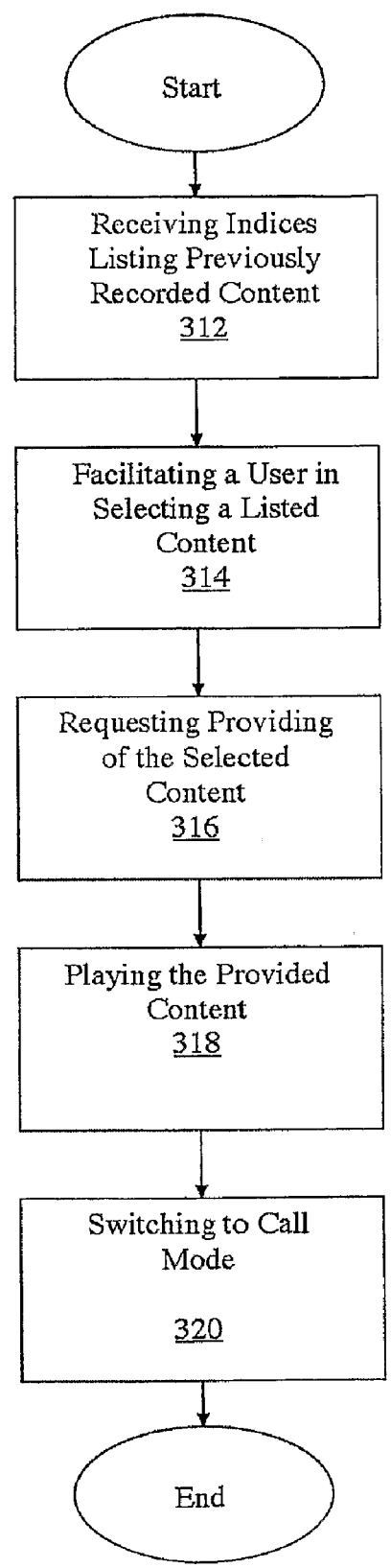
FIG. 3A
FIG. 3B

METHOD AND APPARATUS FOR MOBILE PERSONAL VIDEO RECORDER

CROSS-REFERENCE TO RELATED APPLICATIONS

This application is a national stage application of Patent Cooperation Treaty (PCT) Application No. PCT/US07/69124, filed May 17, 2007, which in turn claims priority to U.S. Provisional Patent Application Ser. No. 60/802,564, entitled "SYSTEM AND METHOD FOR MOBILE PERSONAL VIDEO RECORDER," filed May 22, 2006. These applications are assigned to the same assignee as the present application and incorporated herein by reference in their entireties.

FIELD OF THE INVENTION

The present invention relates generally to the field of mobile devices, in particular, to methods and apparatuses for remotely recording video content and obtaining that recorded content on a mobile device.

BACKGROUND OF THE INVENTION

Conventional mobile devices often provide a great amount of functionality in addition to standard voice communication functions. Additional functionality may include text messaging, selection, retrieval and playback of various audio (e.g., MP3 files, ringtones, etc.) and video products (e.g., mpegs, music videos, etc.), and the like. The downloaded content may be accessed upon receipt, stored for later use (if sufficient storage is available), or some combination of the two.

Conventional mobile devices often access content by streaming the content from content providers and displaying the content as the content is received. Unfortunately, conventional mobile devices may not be equipped to download large volumes of content for later use because of storage limitations, due to the size of currently available storage media. Additionally, conventional devices may not be equipped to identify desired televised content and store the desired content for later use, such as watching a recorded movie or a recorded live televised program.

There are devices available to record video telecasts, such as digital video recorders (DVRs). Unfortunately, DVR technology is not a realistic technological application for mobile devices due to the size constraints of mobile devices, most notably the storage limitations of mobile devices.

BRIEF DESCRIPTION OF THE DRAWINGS

The present invention will be described by way of exemplary embodiments, but not limitations, illustrated in the accompanying drawings in which like references denote similar elements, and in which:

FIGS. 3a-3b illustrate flow diagrams of selected operations of a method for requesting the recording of content on a PVR system, and of requesting and receiving previously recorded content;

DETAILED DESCRIPTION OF ILLUSTRATIVE EMBODIMENTS OF THE INVENTION

Figure 1:
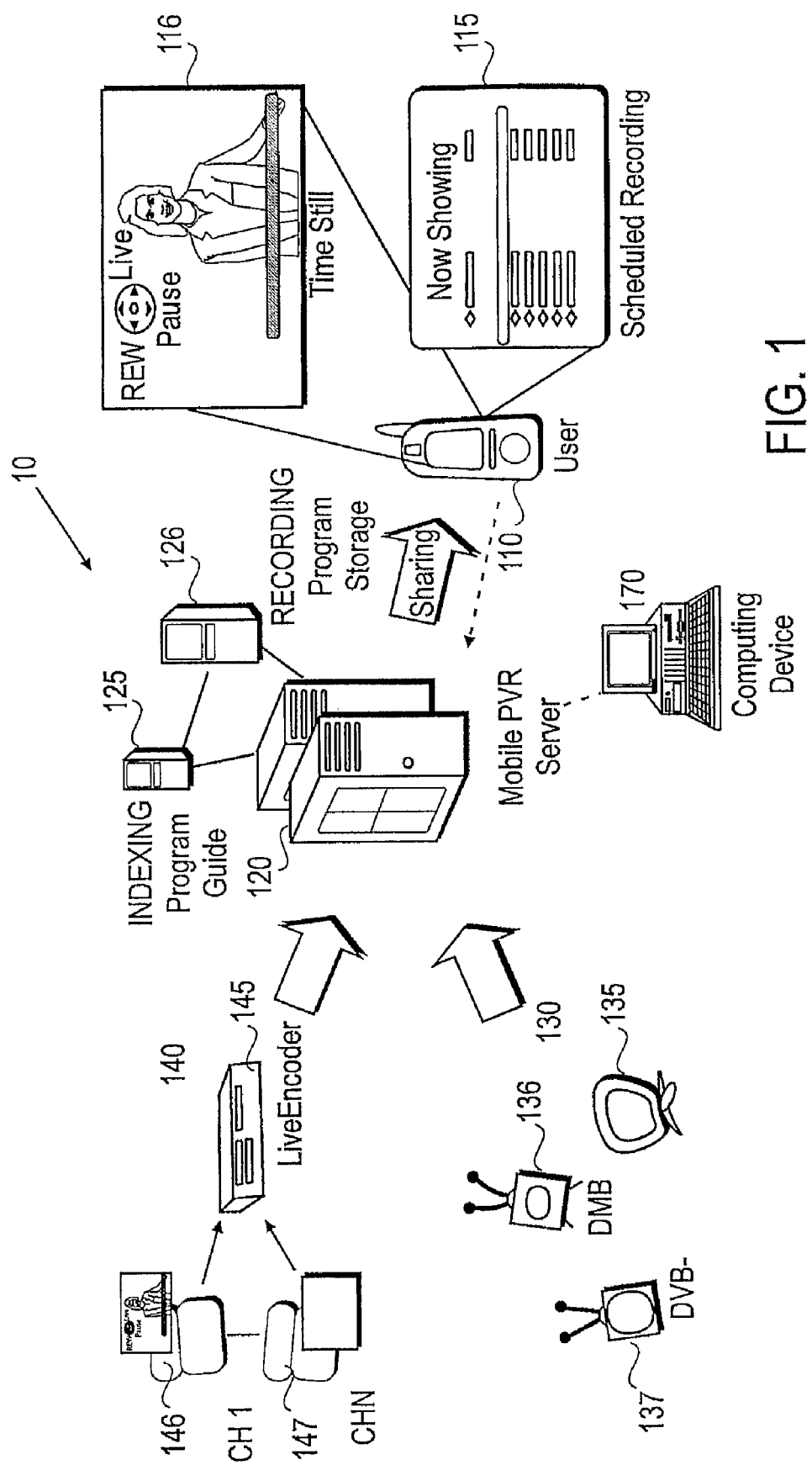
FIG. 1 illustrates an overview of the invention, in accordance with various embodiments.

Illustrative embodiments of the present invention include, but are not limited to methods and apparatuses for receiving, by a mobile device, an index listing one or more media contents that are available for recording currently or at a future time, and/or one or more previously recorded media contents, the one or more previously recorded media contents having been recorded in response to one or more requests from a user of the mobile device. In various embodiments, the mobile device may also facilitate a mobile device user in selecting at least one of the media contents that are available for recording and/or at least one of the previously recorded media contents listed by the index. Further, the mobile device may request of a media recording server, in response to the selection by the mobile device user of the at least one of the media contents, recording of the at least one of the media contents, and/or may request of the media recording server, in response to the selection by the mobile device user of the at least one of the previously recorded media contents, providing of the at least one of the previously recorded media contents to the mobile device.

In some embodiments, the mobile device may also or instead receive a live streaming of a media content, the live streaming provided to the mobile device via a media recording server. Further, the mobile device may facilitate a mobile device user in selecting a time shifting operation to affect playing of the live streaming, the time shifting operation requiring recording of at least a portion of the live streaming by the media recording server. The mobile device may then request of the media recording server, performance of the time shifting operation. In response to receiving the request, the media recording server may perform the time shifting operation, including recording of at least a portion of the live streaming.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The term "media recording server", as used herein, refers to one or more computing devices capable of performing some or all of the operations described herein as being performed by the media recording server. In some embodiments, such as those illustrated by FIG. 1, the media recording server may include a PVR server 120, an indexing system 125, and a recording system 126. In other embodiments, the media recording server may comprise a PVR server, such as the PVR server illustrated by FIG. 5, and a program schedule server, such as the program schedule server illustrated by FIG. 6. In yet other embodiments, the media recording server may only comprise one computing device.

The phrase "in one embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)". The phrase "(A) B" means "(B) or (A B)", that is, A is optional.

FIG. 1 illustrates an overview of the invention, in accordance with various embodiments. As illustrated, a communication system 10 may include mobile device 110, a personal video recorder (PVR) server 120 (hereinafter PVR server 120), broadcast media 130, and unicast media 140. Such a communication system 10 may be a wireless and/or cellular communication network for transmitting and receiving voice and/or data communication to mobile devices. Mobile device 110 may be a two-way wireless and/or telecommunications device that may be compatible with communication system 10 and, as illustrated, may be currently operating within communication system 10. Typically, mobile device 110 has a relatively small form factor, designed for portability, e.g. the size of a hand held device. The term "mobile device" as used herein covers a broad range of such portable devices, but does not include devices affixed or otherwise installed on a movable platform, such as a radio installed in an automobile or a ship. PVR server 120 may be a computing system that may be in communication with mobile device 110, such as via a mobile telephone switching office (MTSO) or a remote, wirelessly-accessible server system. PVR server 120 may receive instructions from mobile device 110 and may send data to mobile device 110 based on the received instructions. For example, PVR server 120 may provide mobile device 110 with one or more indices comprising an index (hereinafter "index"), the index listing media contents and may receive from mobile device 110 requests to record contents listed in the index or to stream previously recorded contents. PVR server 120, in some embodiments, may also include an indexing system 125 and a recording system 126. In some embodiments, indexing system 125 may provide the index to the mobile device 110. Broadcast media 130 may be a pool of content providers (135-137) in communication with PVR server 120 that provide content (e.g., live content) to PVR server 120, such as by establishing a data session and communicating using a multicast or broadcast methodology. Unicast media 140 may be a pool of content providers (145-147) in communication with PVR server 120 that provide live content to PVR server 120, such as by utilizing a unicast methodology. Contents provided by broadcast media 130 and unicast media 140 may include television programs, movies, video clips, pictures, songs, audio files, and/or portions of a television program, a movie, a video clip, a picture, a song, and/or an audio file.

As is also shown, mobile device 110 may include a scheduled recording application 115 and a time shifting application 116. Scheduled recording application 115 may include a graphical user interface (GUI) for displaying to a mobile device 110 user the above-mentioned index and for facilitating the user in selecting one or more of the items listed in the index. Scheduled recording application 115 may then request of PVR server 120 the recording of the selected item(s). Time shift application 116 may be a streaming client that allows the user to control the delivery of content to the mobile device 110, such as the controlling of the streamed content at mobile device 110, for example controlling the viewing of the streamed content (e.g., pause, rewind, fast-forward, and the like) on the GUI of mobile device 110.

Figure 2:
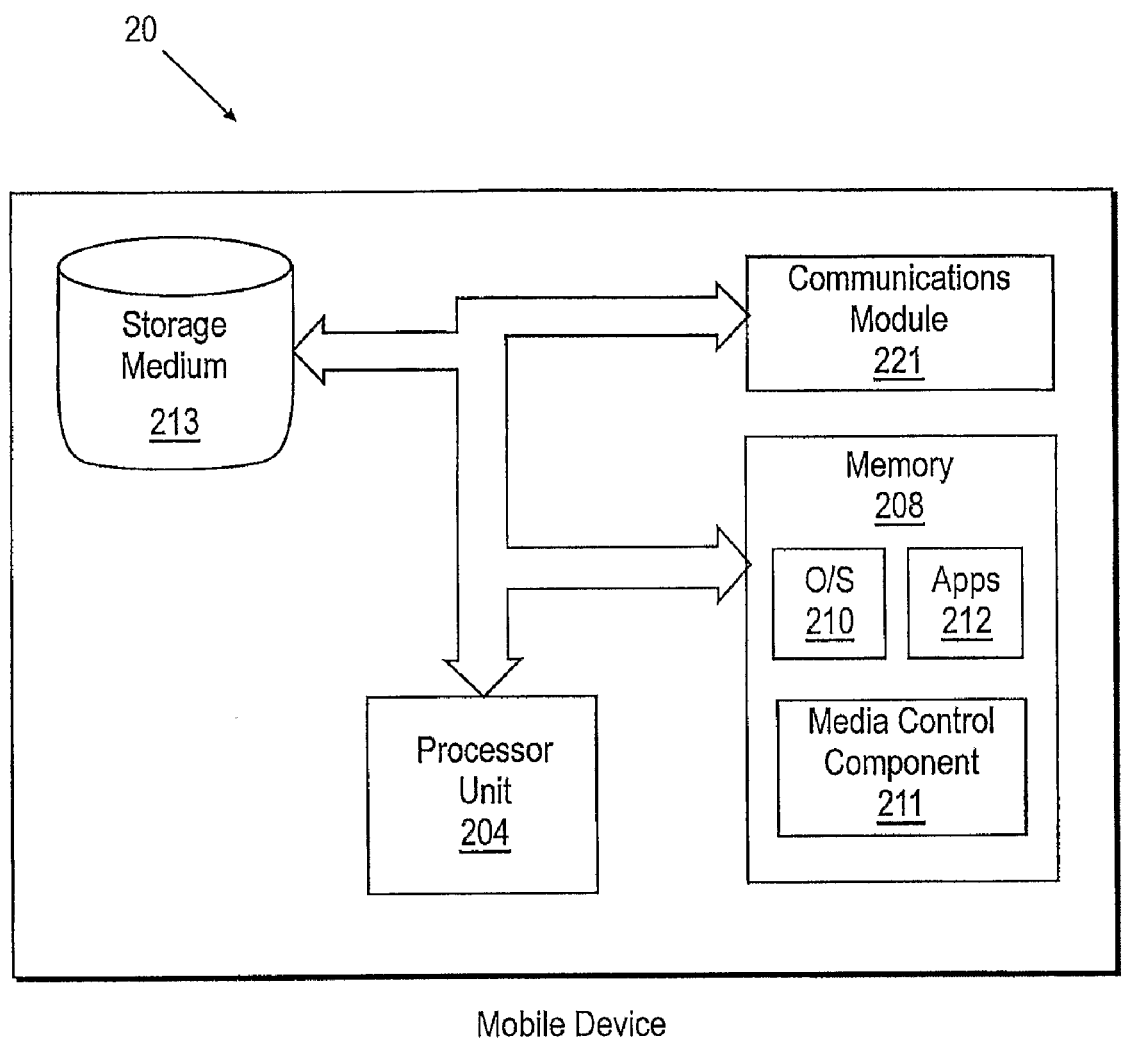
FIG. 2 illustrates an exemplary mobile device, in accordance with various embodiments.

Mobile device 110 may be one of a cellular phone, a personal digital assistant, and a media player, and may be configured for two-way communication with PVR server 120 including voice communication and data streaming. Mobile device 110 may include a graphical user interface (GUI) capable of displaying operational content associated with applications 115 and 116. In one embodiment, mobile device 110 may be capable of operating in a plurality of modes, such as a data mode, a call mode, and a messaging mode. In data mode, mobile device 110 may communicate with PVR server 120 to send and receive media contents, indexes, and requests relating thereto. In call mode, mobile device 110 may send and receive cellular or IP telephony phone calls, and in messaging mode, mobile device 110 may send and receive text messages and emails. Mobile device 110 may further comprise any mechanism known in the art for switching between modes. Also, an exemplary mobile device 110 is shown in FIG. 2 and is described in greater detail below.

Scheduled recording application 115 may be an application allowing the user to schedule the recording of content at PVR server 120 for later download and viewing. Examples of scheduled recording application 115 may include a wireless application protocol (WAP) or Web page accessed via a session between the mobile device 110 and the service provider utilizing a mobile browser, an application running on a mobile device, a network-connected personal computer (PC) application, and the like. Scheduled recording application 115 may receive from PVR server 120 an index of previously recorded content currently available for streaming as well as content available immediately or at one or more future points in time for recording from content providers, such as broadcast media 130 and unicast media 140, to a recording portion of PVR server 120. In one embodiment, the indexing system 125 of PVR server 120 may generate and provide the index to mobile device 110. In various embodiments, the previously recorded media content may have been recorded in response to one or more requests from a user of the mobile device 110. Scheduled recording application 115 may then provide that received index to users of the mobile device 110 to facilitate the users in selecting an item for receiving and playing or for recording.

Methodologies for receiving programming index data by scheduled recording application 115 may include receiving via a cellular network, receiving via a wired network utilizing the Internet, receiving utilizing a combination of a cellular network and a wired network utilizing the Internet, and the like. In one embodiment, the programming index data may be requested by the mobile device 110 of the indexing system 125 and received when the user activates schedule recording application 115. In another embodiment, the programming index data may be updated on a regular/scheduled basis. Upon receiving and displaying the index to the mobile device 110 user, the scheduled recording application 115 may facilitate the user in selecting content to record at a PVR server 120. The scheduled recording application may then submit the instructions for which contents to record to the PVR server 120 for implementation, such as with a client-side PVR server 120 available from nCUBE. In one embodiment, the media contents may include a series of related discrete contents rendered or presented at different points in time, and the scheduled recording application 115 may facilitate the mobile device 110 user requesting recording of the related discrete contents of the series at the different points in time. Such a series of related discrete contents may include a repeating program, a channel, or a time slot.

In various embodiments, the scheduled recording application 115 may also facilitate the user in selecting previously recorded content listed by the index for streaming, may submit instructions to the PVR server 120 requesting streaming of the recorded content, and may receive and facilitate display of the previously recorded content on the mobile device 110. In one embodiment, the previously recorded media contents may have been recorded based on one or more mobile device 110 user requests, the requests based at least in part on a previous index that was received by the mobile device 110, the previous index listing the one or more previously recorded media contents as one or more media contents that are available for recording. In a further embodiment, the previously recorded media content may have been recorded based on a mobile device 110 user request, the request submitted through a computing device 170 of the mobile device 110 user, the computing device 170 separate and distinct from the mobile device 110.

As previously mentioned, time shift application 116 may be a streaming client that allows the user to control the delivery of content to the mobile device 110, such as the controlling of the streamed content at mobile device 110, for example controlling the viewing of the streamed content on the GUI of mobile device 110. Such control may include one or more time shifting operations known in the art, such as a pause operation, a rewind operation, a fast-forward operation, and the like. In some embodiments, the time shifting application 116 may be adapted to initiate a live streaming session between PVR server 120 and mobile device 110, and to receive content at mobile device 110 from PVR server 120. In one embodiment, the received content may be the content identified and selected via the scheduled recording application 115, as described above. Time shifting application 116 may then provide the received content to a mobile device 110 user through a graphical user interface (GUI) of the mobile device. In various embodiments, time shifting application 116 may then facilitate the user in selecting a time shifting operation through the GUI.

In one embodiment, the selected time shifting operation may be a pause operation, and the received content may be manipulated by pausing the content to be provided to the GUI. For example, in a live session, the "Fast Forward" and "Rewind" buttons may be disabled in the GUI. However, a user may select 'PAUSE' for a live session. In response to the user's selection of the 'PAUSE' button, the mobile device 110 may request performing of the 'PAUSE' time shifting operation by the PVR server 120, and the PVR server 120 may start recording the live streaming session in the PVR server 120 side. When the user selects the 'PLAY' button, the PVR server 120 may continue streaming from the point of pausing using the recorded stream. In this case, the PVR server 120 may be continuously recording the live session because the PVR server 120 may actually be streaming past content even if it is a live session. However, because it may not be reasonable to record large amounts of data for lengthy amounts of time (e.g., pausing), the amount of time allocated for pausing the stream of data may be configurable at the PVR server 120 side. For example, if the amount of time allocated for pausing is set to 10 minutes, the PVR server 120 may only support time shifting for an amount of time allocated for pausing that may be less than the proscribed 10 minutes. In this example, if amount of time allocated for pausing exceeds 10 minutes, the PVR server 120 may use the input stream from a live source without using the recorded stream. Additionally, the amount of time allocated for pausing feature may be disabled by configuration while allowing the PVR server 120 to record the live stream regardless of any time limitation.

In another example, during a live session, the PVR server 120 may initiate a streaming session, such as a file streaming session, with a lengthy duration.

In this example, the 'Fast Forward' and 'Rewind' buttons on the GUI may not be disabled because the mobile device understands the session as a file streaming session. In this example, the PVR server 120 may continue recording a live streaming session simultaneously with providing the live streaming of the content to the mobile device 110. For pausing, the PVR server 120 may function as described above. In this example, a user may use the 'Fast Forward' and 'Rewind' buttons as well. If the 'Fast Forward' and 'Rewind' buttons are selected by the user, the PVR server 120 may use the recorded stream to respond to the user's button selection. However, the range of 'Fast forward' may be limited to the position of currently serviced live stream.

PVR server 120 may be any sort of computing device known in the art and may also include or be associated with an indexing system 125 and a recording system 126. In one embodiment, illustrated by FIG. 5, PVR server 120 may only include a recording system 126, and indexing system 125 may belong to another computing device of the media recording server. Indexing system 125 may be a computing system that may be configured to query and receive information from broadcast media 130 and unicast media 140 describing available and scheduled (e.g., future scheduled live and broadcast) content. Indexing system 125 may generate an index of the received information and may provide the index to mobile device 110 via PVR server 120 for use by a user. Indexing system 125 may also generate an index of previously recorded media contents by querying the PVR server 120 and/or recording system 126 for previously recorded media contents. Indexing system 125 may then generate an index of the previously generated media contents, which in some embodiments may be part of the same index as the scheduled and available content. In one embodiment, illustrated by FIG. 6, indexing system 125 may be a separate computing device of the media recording server, different from PVR server 120 and recording system 126. Recording system 126 may include a plurality of storage media and may be configured to receive and store specific content, such as specific content identified by a user utilizing mobile device 110.

Upon generation of the index by the indexing system 125, the indexing system 125 may provide the index to the mobile device 110, either directly or indirectly, through PVR server 120. In other embodiments, the index may be accessed via a web page utilizing a computing device 170, such as a PC, associated with the mobile device 110 user through an Internet connection. When the user selects desired content from the index, the PVR server 120 may schedule the content to be recorded to recording system 126 for storage and later retrieval. In various embodiments, the index may be generated and provided at pre-determined intervals, upon demand from a mobile device 110, or both.

At some time after providing the index, PVR server 120 may receive a request for recording of content listed by the index. In response, PVR server 120 may have recording server 126 record the desired content at its scheduled time. Also, PVR server 120 may receive a request for providing of previously recorded content listed in the index. In response, PVR server 120 may stream or otherwise provide the recorded content from the recording system 126 to the mobile device 110 for playing on mobile device 110. In various embodiments, PVR server 120 may also provide a live streaming of content to a mobile device 110. In one embodiment, PVR server 120 may record the content to recording system 126 simultaneously with streaming the content. PVR server 120 may then receive a request for a time shifting operation from mobile device 110, as described in greater detail above. In response to a pause operation, for example, PVR server 120 may begin recording.

In FIG. 2, the mobile device 20 may be any handheld computing device, such as a cellular telephone, a personal digital assistant with cellular connectivity, or the like. In this example, mobile device 20 may include a processor unit 204, a memory 208, and a storage medium 213. The processor unit 204 may advantageously include a microprocessor or a special-purpose processor such as a digital signal processor (DSP), but may in the alternative be any conventional form of processor, controller, microcontroller, or state machine. Mobile device 20 may also include additional components not relevant to the present discussion.

The processor unit 204 may be coupled to the memory 208, which may be advantageously implemented as RAM memory holding software instructions that may be executed by the processor unit 204. In this embodiment, the software instructions stored in the memory 208 may include one or more applications 212 (e.g., scheduled recording application 115 and time shift application 116), a media control component 211, and an operating system 210. The memory 208 may be on-board RAM, or the processor unit 204 and the memory 208 could collectively reside in an Application Specific Integrated Circuit (ASIC). In an alternate embodiment, the memory 208 may be composed of firmware or flash memory, such as a SmartMedia card.

The processor unit 204 may also be coupled to the storage medium 213, which may be implemented as any nonvolatile memory, such as ROM memory, flash memory, or a magnetic disk drive, just to name a few. The storage medium 213 may also be implemented as any combination of those or other technologies, such as a magnetic disk drive with cache (RAM) memory, or the like. In this particular embodiment, the storage medium 213 may be used to store data during periods when the mobile device 201 may be powered off or without power.

The mobile device 20 may also include a communications module 221 that enables bidirectional communication between the mobile device 201 and one or more other computing devices. The communications module 221 may include components to enable RF or other wireless communications, such as a cellular telephone network, Bluetooth connection, Mobile WiMax, or a wireless local or wide area network. Alternatively, the communications module 221 may include components to enable land line or hard wired network communications, such as an Ethernet connection, universal serial bus connection, or the like (such as for allowing a user to operate scheduled recording application 115 on mobile device 20 to send a schedule request via a wired connection).

In operation, a user may access scheduled recording application 115 and time shift application 116 that are running in application 212 via media control component 211. The applications may be running on processing unit 204. The resulting streamed media content that mobile device 20 may receive via communication module 221 may be temporarily stored at storage medium 213 prior to being passed to the GUI (not shown) for display to the user.

FIGS. 3a-3b illustrate flow diagrams of selected operations of a method for requesting the recording of content on a PVR system, and of requesting and receiving previously recorded content. As illustrated in FIG. 3a, a mobile device may first receive a collection of one or more indices listing one or more media contents that are available for recording currently or at one or more future points in time, block 302. In some embodiments, the mobile device may be one of a cellular phone, a personal digital assistant, or a media player.

In various embodiments, the one or more media contents that are available for recording may include at least one of a unicast, a broadcast, or a multicast of media contents, and may be one or more of television programs, movies, video clips, pictures, songs, audio files, and/or portions of a television program, a movie, a video clip, a picture, a song, and/or an audio file. Upon receiving the collection of indices, the mobile device may facilitate a mobile device user in selecting at least one of the media contents listed by the collection of indices, block 304. The mobile device may then request of a media recording server, in response to the selection by the mobile device user of the at least one of the media contents, recording of the at least one of the media contents, block 306. In various embodiments, the media contents may include a series of related discrete contents rendered or presented at different points in time, and the requesting recording of the at least one of the one or more media contents that are available for recording comprises requesting recording of the related discrete contents of the series at the different points in time, block 306, comprises requesting recording of the repeating series. Also, as is shown, said receiving, facilitating, and requesting may be performed in a data mode of the mobile device, and the mobile device may switch to either a call mode of the mobile device to facilitate the mobile device user in making or receiving a phone call using the mobile device, or a messaging mode of the mobile device to facilitate the mobile device user in sending or receiving a message using the mobile device, block 308.

As illustrated in FIG. 3b, a mobile device may first receive a collection of one or more indices listing one or more previously recorded media contents, the one or more previously recorded media contents having been recorded in response to one or more requests from a user of the mobile device, block 312. In some embodiments, the mobile device may be one of a cellular phone, a personal digital assistant, or a media player. In various embodiments, the one or more previously recorded media contents may include at least one of a unicast, a broadcast, or a multicast of media contents, and may be one or more of television programs, movies, video clips, pictures, songs, audio files, and/or portions of a television program, a movie, a video clip, a picture, a song, and/or an audio file. Additionally, in one embodiment, the one or more previously recorded media contents may have been recorded based on one or more mobile device user requests, the requests based at least in part on a previous collection of indices that was received by the mobile device, the previous collection of indices listing the one or more previously recorded media contents as one or more media contents that are available for recording. Also, in some embodiments, the one or more previously recorded media contents may have been recorded based on one or more mobile device user requests, the requests submitted through a computing device of the mobile device user, the computing device separate and distinct from the mobile device. Upon receiving the collection of indices, the mobile device may facilitate a mobile device user in selecting at least one of the media contents listed by the collection of indices, block 314. The mobile device may then request of a media recording server, in response to the selection by the mobile device user of the at least one of the previously recorded media contents, providing of the at least one of the previously recorded media contents to the mobile device, block 316. Upon receiving the at least one of the previously recorded media contents, the mobile device may play the at least one of the previously recorded media contents on the mobile device, block 318. Also, as is shown, said receiving, facilitating, and requesting may be performed in a data mode of the mobile device, and the mobile device may switch to either a call mode of the mobile device to facilitate the mobile device user in making or receiving a phone call using the mobile device, or a messaging mode of the mobile device to facilitate the mobile device user in sending or receiving a message using the mobile device, block 320.

Figure 4:
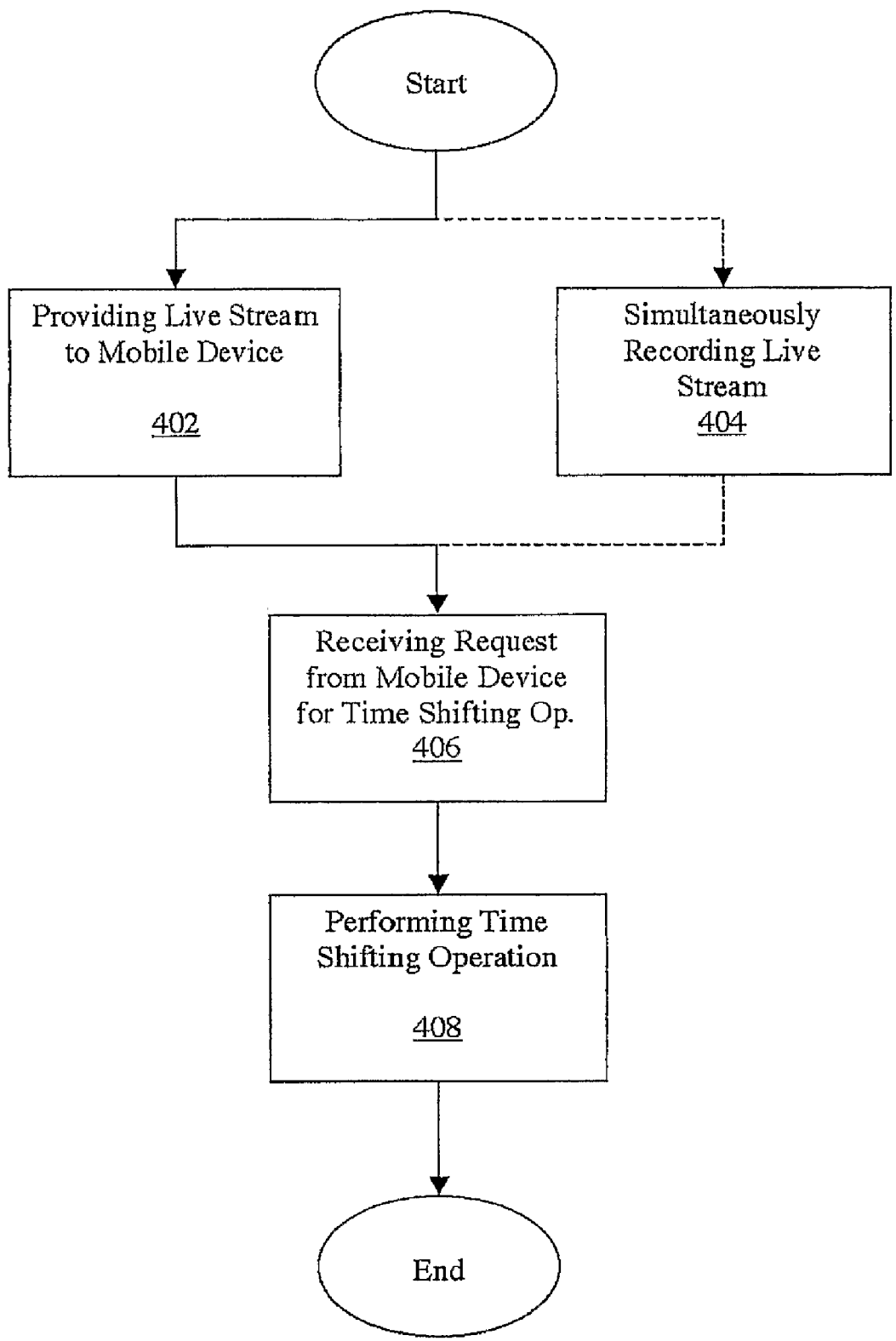
FIG. 4 illustrates a flow diagram of selected operations of a method for controlling the received content, such as time shifting the reception of the content.

FIG. 4 illustrates a flow diagram of selected operations of a method for controlling the providing content, such as time shifting the providing of the content. As illustrated, a media recording server may provide a live stream of media content to a recipient mobile device, block 402. In various embodiments, the media recording server may simultaneously record the media content while providing the live streaming of the media content, block 404. While providing the live stream of the media content, the media recording server may receive a request from the recipient mobile device, the request specifying a time shifting operation to affect playing of the live stream, the time shifting operation having been requested by a mobile device user through the recipient mobile device, block 406. The media recording server may then perform the time shifting operation, including recording of at least a portion of the live stream, block 408. In some embodiments, the time shifting operation may be one of a pause, a rewind, and a fast forward. In various embodiments, the recording by the media recording server may further comprise recording a portion of the media content in response to receiving a request for a pause operation. Also, in one embodiment, the media recording server may have a maximum time threshold for recording in response to receiving a pause operation request.

Figure 5:
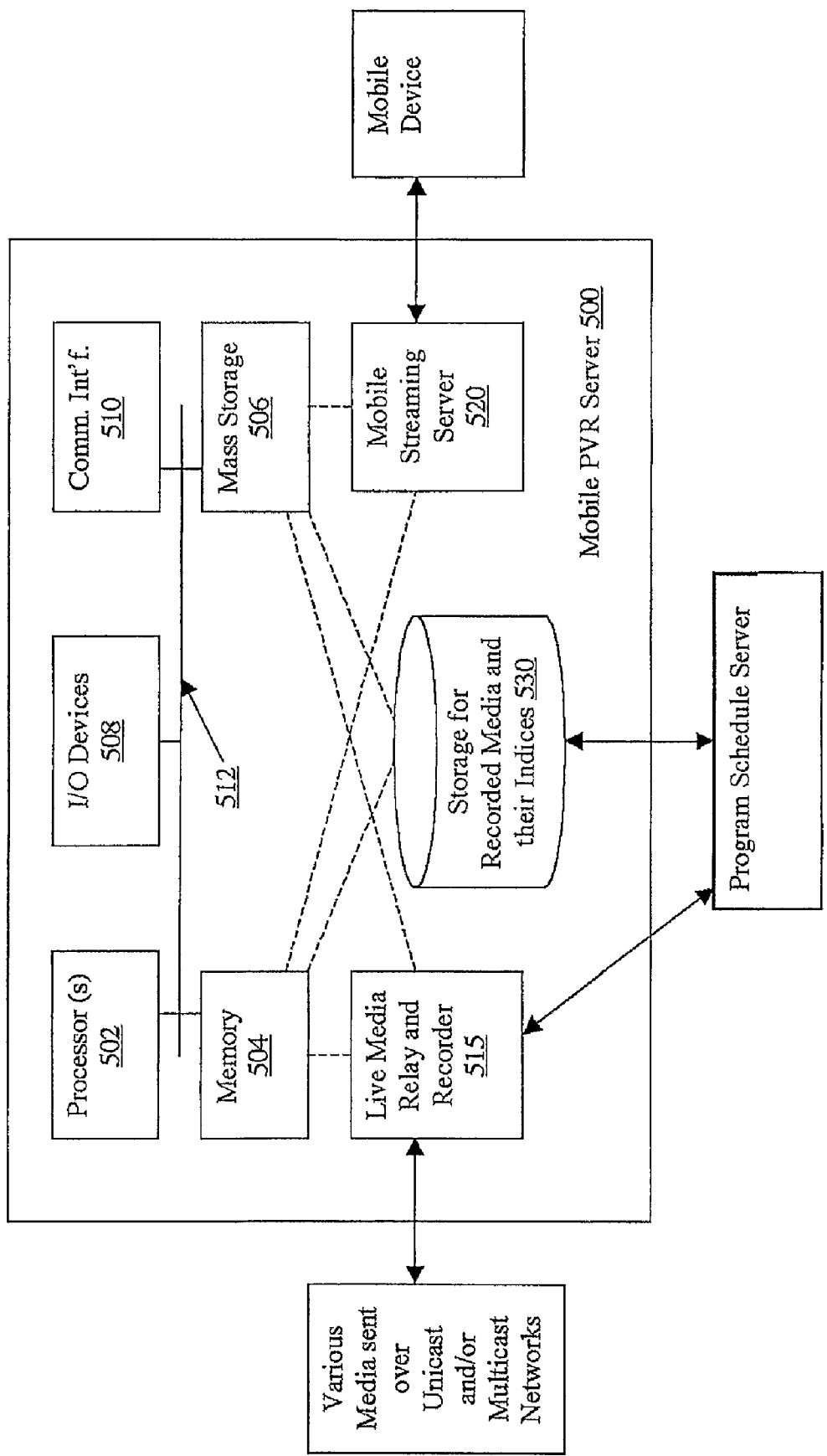
FIG. 5 illustrates a first exemplary computing device of a personal video recording server, in accordance with various embodiments.

FIG. 5 illustrates a first exemplary computing device of a personal video recording server, in accordance with various embodiments. As shown, mobile PVR server 500 may include one or more processors 502, and system memory 504. Additionally, mobile PVR server 500 may include mass storage devices 506 (such as diskette, hard drive, CDROM and so forth), input/output devices 508 (such as keyboard, cursor control and so forth) and communication interfaces 510 (such as network interface cards, modems and so forth). The elements may be coupled to each other via system bus 512, which represents one or more buses. In the case of multiple buses, they may be bridged by one or more bus bridges (not shown).

System memory 504 and mass storage 506 may be employed to store a working copy and a permanent copy of the programming instructions implementing one or more aspects of the live media relay and recorder 515 and mobile streaming server 520, as well as to store recorded media and their indices 530 (storage 530). The programming instructions may be implemented in assembler instructions supported by processor(s) 502 or high level languages, such as C, that may be compiled into such instructions. The permanent copy of the programming instructions may be placed into permanent storage 506 in the factory, or in the field, through e.g. a distribution medium (not shown) or through communication interface 510 (from a distribution server (not shown)).

As is also shown, mobile PVR server 500 may be communicatively coupled to various unicast and multicast networks to receive media via those networks, to a program schedule server (illustrated in FIG. 6 and described in greater detail below), and to one or more mobile devices. Further, mobile PVR server 500 may be any one or more computing devices and its components may perform some or all of the operations described above with regard to the PVR server 120.

Live media relay and recorder 515 may record unicast and/or multicast media from the above-mentioned networks, upon receipt of a request either directly from a mobile device or indirectly through the program schedule server. The recorded content may be stored in storage 530 for future retrieval. Also, live media relay and recorder 515 may relay live streams of content to mobile streaming server 520 for mobile streaming server to provide the content to a mobile device. In some embodiments, mobile PVR server 500 may also receive requests for streaming of recorded content, and mobile streaming server 520 may retrieve the recorded content from storage 530 and stream it to the mobile device. In one embodiment, mobile PVR server 500 may further receive from mobile devices requests to record content listed in an index that the mobile device received from program schedule server. Mobile PVR server 500 may then either store the request itself or store the request in storage of the program schedule server, and may, at the appropriate time, record the content.

Further, in various embodiments, mobile PVR server 500 may receive requests specifying time shifting operations while providing a live stream of content to a mobile device. In response, mobile PVR server 500 may record some or the entire stream of content. Further details regarding time shifting operations are described above in greater detail in the description associated with FIG. 1.

Figure 6:
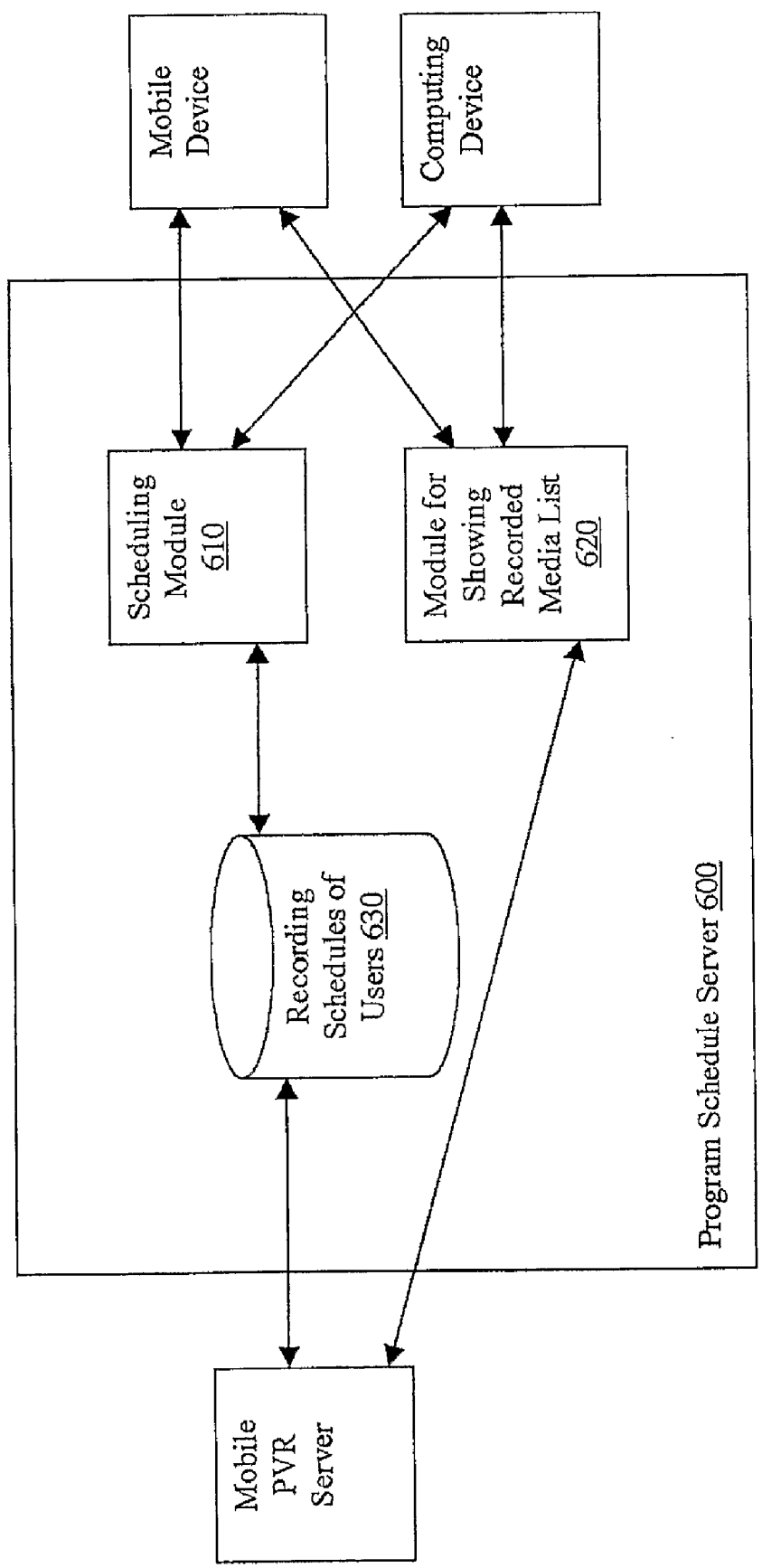
FIG. 6 illustrates a second exemplary computing device of a personal video recording server, in accordance with various embodiments.

FIG. 6 illustrates a second exemplary computing device of a personal video recording server, in accordance with various embodiments. As illustrated, a program schedule server may include a scheduling module 610, a module for showing recorded media lists 620, and storage for recording schedules of user 630. In various embodiments, the program schedule server and its components may perform the operations described above with regard to the indexing system 125. The program schedule server may also be a part of the media recording server, and may be comprised of any one or more computing devices. As is shown, the program schedule server may be communicatively coupled to a mobile PVR server (illustrated in FIG. 5 and described in greater detail above), one or more mobile devices, and, optionally, computing devices associated with users of the mobile devices.

The scheduling module 610 may generate an index of media content available now or at one or more future points in time, and may provide that index to one or both of the mobile devices and computing devices, automatically or upon request. The scheduling module 610 may then also store the generated index in the storage for recording schedules of users 630. In one embodiment, scheduling module 610 may also receive a request from a mobile device or computing device for recording, by the mobile PVR server, of content listed in the index. These requests may also be stored in storage 630. The mobile PVR server may then retrieve the requests from the storage 630 and record the requested content. Upon finishing recording, the mobile PVR server may provide an indication that recording is complete to program schedule server, which may be stored in storage 630.

As is further shown, module for showing recorded media lists 620 may generate an index of previously recorded media contents. Module 620 may retrieve a list of such contents from storage 620, if stored there as described above, or directly from the mobile PVR server. Module 620 may then provide the index of recorded contents to the mobile device and/or the PC.

Although specific embodiments have been illustrated and described herein for purposes of description of the preferred embodiment, it will be appreciated by those of ordinary skill in the art that a wide variety of alternate and/or equivalent implementations may be substituted for the specific embodiment shown and described without departing from the scope of the present invention. Those with skill in the art will readily appreciate that the present invention may be implemented in a very wide variety of embodiments. This application is intended to cover any adaptations or variations of the embodiments discussed herein. Therefore, it is manifestly intended that this invention be limited only by the claims and the equivalents thereof.

What is claimed is:

1. A method, comprising:
receiving, by a mobile device from a sender, a collection of one or more indices listing one or more media contents that are available to record at one or more future performances;
facilitating, by the mobile device, selection of at least one of the media contents listed by the collection of indices; and
requesting by the mobile device, of a media recording server remotely disposed from the mobile device and in response to the selection by the mobile device of the at least one of the media contents, to record a selected future performance of the at least one of the media contents, wherein the sender and the media recording server are different entities,
wherein the selected future performance includes a live performance, and wherein said requesting the media server to record the selected future performance includes:
sending, by the mobile device during playing of the live performance, a pause command to the media recording server to instruct the media recording server to perform a time shifting operation in which the media recording server begins recording at a point of the live performance corresponding to the pause command, and then the media recording server plays back the recorded performance at the point corresponding to the pause command in response to a subsequent play command sent from the mobile device.

2. The method of claim 1, wherein the media contents are one or more of television programs, movies, video clips, pictures, songs, audio files, and/or portions of a television program, a movie, a video clip, a picture, a song, and/or an audio file.

3. The method of claim 1, wherein the one or more media contents that are available to record include at least one of a unicast, a broadcast, or a multicast of media contents.

4. The method of claim 1, wherein the mobile device includes one of a cellular phone, a personal digital assistant, or a media player.

5. The method of claim 1, wherein the media contents include a series of related discrete contents rendered or presented at different points in time, and the requesting recording of the at least one of the one or more media contents that are available to record includes requesting recording of the related discrete contents of the series at the different points in time.

6. The method of claim 1, wherein said receiving, facilitating, and requesting are performed in a data mode of the mobile device, and wherein the method further comprises switching the mobile device to either a call mode of the mobile device to facilitate the mobile device to make or receive a phone call, or a messaging mode of the mobile device to facilitate the mobile device to send or receive a message.

7. A method, comprising:
receiving, by a mobile device from a sender, a collection of one or more indices listing one or more previously recorded media contents, the one or more previously recorded media contents having been recorded during their performances, in response to one or more requests pre-submitted preceding at least one of the performances;
facilitating, by the mobile device, selection of at least one of the previously recorded media contents listed by the collection of indices; and
requesting by the mobile device, of a media recording server remotely disposed from the mobile device, in response to the selection of the at least one of the previously recorded media contents, to provide the selected at least one of the previously recorded media contents to the mobile device or another display device,
wherein the at least one of the previously recorded media contents includes a recording of a live performance, and wherein the one or more pre-submitted requests includes:
a pause command sent by the mobile device to the media recording server, to instruct the media recording server to perform a time shifting operation in which the media recording server begins recording at a point of the live performance corresponding to the pause command, and then the media recording server plays back the recorded performance at the point corresponding to the pause command in response to a subsequent play command sent from the mobile device.

8. The method of claim 7, wherein the one or more pre-submitted requests were pre-submitted through a computing device separate and distinct from the mobile device.

9. The method of claim 7, further comprising playing the at least one of the previously recorded media contents on the mobile device.

10. The method of claim 7, wherein the previously recorded media contents are one or more of television programs, movies, video clips, pictures, songs, audio files, and/or portions of a television program, a movie, a video clip, a picture, a song, and/or an audio file.

11. The method of claim 7, wherein the one or more previously recorded media contents include at least one of a unicast, a broadcast, or a multicast of media contents.

12. The method of claim 7, wherein mobile device includes one of a cellular phone, a personal digital assistant, or a media player.

13. The method of claim 7, wherein said receiving, facilitating, and requesting are performed in a data mode of the mobile device, and wherein the method further comprises switching the mobile device to either a call mode of the mobile device to facilitate the mobile device to make or receive a phone call, or a messaging mode of the mobile device to facilitate the mobile device to send or receive a message.

14. A method, comprising:
providing, by a media recording server, a live stream of a media content to a recipient mobile device remotely disposed from the media recording server, wherein the recipient mobile device is a cellular phone and the live stream of media content is provided to the mobile phone via a cellular network;
receiving, by the media recording server and while said providing the live stream of the media content, a pause request from the recipient mobile device, the pause request specifying a time shifting operation to affect playing of the live stream, the time shifting operation having been requested by the recipient mobile device; and performing, by the media recording server, the time shifting operation, including recording of at least a portion of the live stream at a point of the live stream corresponding to the pause request, and then the media recording server plays back the recorded stream at the point corresponding to the pause request in response to a subsequent play request sent from the recipient mobile device.

15. The method of claim 14, wherein the time shifting operation further includes one of a rewind or a fast forward.

16. The method of claim 14, wherein the live stream of the media content includes audio.

17. The method of claim 14, wherein the live stream of the media content includes video content.

18. The method of claim 14, wherein the media recording server has a maximum time threshold to record in response to receiving the pause request.

19. A mobile device, comprising:
a processor; and
logic operated by the processor and configured to:
receive from a sender, a collection of one or more indices listing one or more media contents that are available to record during their performances at one or more future points in time,
facilitate selection of at least one of the media contents listed by the collection of indices, and
request, of a media recording server remotely disposed from the mobile device and in response to the selection of the at least one of the media contents, to record the at least one of the media contents if the at least one of the media contents is performed,
wherein the at least one of the media contents includes a live performance, and wherein said request the media server to record the at least one of the media contents includes:
send, during playing of the live performance, a pause command to the media recording server to instruct the media recording server to perform a time shifting operation in which the media recording server begins recording at a point of the live performance corresponding to the pause command, and then the media recording server plays back the recorded performance at the point corresponding to the pause command in response to a subsequent play command.

20. The mobile device of claim 19, wherein the one or more media contents that are available for recording include at least one of a unicast, a broadcast, or a multicast of media contents.

21. The mobile device of claim 19, wherein said receive, facilitate, and request are performed in a data mode of the mobile device, and wherein the logic is further configured to switch the mobile device to either a call mode of the mobile device to facilitate the mobile device to make or receive a phone call, or a messaging mode of the mobile device to facilitate the mobile device to send or receive a message.

22. A mobile device, comprising:
a processor; and
logic operated by the processor and configured to:
receive from a sender, a collection of one or more indices listing one or more previously recorded media contents, the one or more previously recorded media contents having been recorded during their performances, in response to one or more requests pre-submitted from one or more mobile devices prior to performance of the one or more media contents,
facilitate the mobile device in selection of at least one of the previously recorded media contents listed by the collection of indices, and
request, of a media recording server remotely disposed from the mobile device and in response to the selection by the mobile device of the at least one of the previously recorded media contents, to provide the at least one of the previously recorded media contents to the mobile device or another display device,
wherein the at least one of the previously recorded media contents includes a recording of a live performance, and wherein the one or more pre-submitted requests includes:
a pause command, sent by the mobile device to the media recording server, to instruct the media recording server to perform a time shifting operation in which the media recording server begins recording at a point of the live performance corresponding to the pause command, and then the media recording server plays back the recorded performance at the point corresponding to the pause command in response to a subsequent play command sent from the mobile device.

23. The mobile device of claim 22, wherein the logic is further configured to play the at least one of the previously recorded media contents on the mobile device.

24. A mobile device, comprising:
a processor; and
logic operated by the processor and adapted to:
receive a live stream of a media content, the live stream provided to the mobile device via a media recording server remotely disposed from the mobile device,
facilitate selection of a time shifting operation to affect playing of the live stream, the time shifting operation requiring recordation of at least a portion of the live stream by the media recording server, and
request, of the media recording server and in response to the selection of the time shifting operation, performance of the time shifting operation, wherein the mobile device is a cellular phone and the live stream is provided to the mobile phone via a cellular network,
wherein the time shifting operation is performed in response to a pause request sent from the mobile device, and wherein said recordation of the at least the portion of the live stream occurs at a point of the live stream corresponding to the pause request, and then the media recording server plays back the recorded stream at the point corresponding to the pause request in response to a subsequent play request sent from the mobile device.

25. The mobile device of claim 24, wherein the time shifting operation further includes a rewind or a fast forward.

26. The mobile device of claim 24, wherein the live stream of the media content includes audio or video.

* * * * *